(12) United States Patent
Wang et al.

(10) Patent No.: US 9,740,048 B2
(45) Date of Patent: Aug. 22, 2017

(54) DISPLAY DEVICE

(71) Applicants:BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Huan Wang, Beijing (CN); Mookeun Shin, Beijing (CN); Zhizhong Tu, Beijing (CN); Yongjun Yoon, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 14/571,971

(22) Filed: Dec. 16, 2014

(65) Prior Publication Data

US 2016/0041429 A1    Feb. 11, 2016

(30) Foreign Application Priority Data

Aug. 6, 2014 (CN) .......................... 2014 1 0384550

(51) Int. Cl.
*G02F 1/1335* (2006.01)

(52) U.S. Cl.
CPC .. *G02F 1/133617* (2013.01); *G02F 1/133553* (2013.01); *G02F 1/133555* (2013.01)

(58) Field of Classification Search
None
See application file for complete search history.

(56) References Cited

U.S. PATENT DOCUMENTS

2009/0273744 A1* 11/2009 Wang .................. G02B 5/3058
                                                                  349/96
2013/0335799 A1    12/2013 Yoon et al.
(Continued)

FOREIGN PATENT DOCUMENTS

CN          1786795 A       6/2006
CN        102819154 A      12/2012
(Continued)

OTHER PUBLICATIONS

Office Action dated Jul. 22, 2016 issued in corresponding Chinese Application No. 201410384550.8.

*Primary Examiner* — Ashok Patel
(74) *Attorney, Agent, or Firm* — Nath, Goldberg & Meyer; Joshua B. Goldberg; Christopher Thomas

(57) ABSTRACT

The present invention relates to a display device. The display device comprises a color filter substrate comprising a color filter layer, an array substrate and a liquid crystal layer disposed between the color filter substrate and the array substrate, characterized in that the display device further comprises a reflective layer and a light excitation layer; the reflective layer is disposed on the side away from the liquid crystal layer of the array substrate, the light excitation layer and the color filter substrate are disposed on the same side of the liquid crystal layer; the light excitation layer emits stimulated light upon being excited by external light and the reflective layer is capable of reflecting the stimulated light to the color filter layer. The display device enhances the utilization to the external light and achieves a higher brightness and an improved color gamut.

15 Claims, 8 Drawing Sheets

(56) References Cited

U.S. PATENT DOCUMENTS

| | | | | |
|---|---|---|---|---|
| 2014/0063413 A1* | 3/2014 | Kim | ................... | G02F 1/133504 |
| | | | | 349/65 |
| 2014/0132890 A1* | 5/2014 | Zhang | ............... | G02F 1/133514 |
| | | | | 349/69 |
| 2015/0145405 A1* | 5/2015 | Yang | ................... | H01L 27/3211 |
| | | | | 313/498 |

FOREIGN PATENT DOCUMENTS

| | | |
|---|---|---|
| CN | 102944943 A | 2/2013 |
| CN | 103278876 A | 9/2013 |
| CN | 203223802 U | 10/2013 |
| CN | 103472513 A | 12/2013 |
| JP | 2013037165 A | 2/2013 |

\* cited by examiner

DISPLAY DEVICE

FIELD OF THE INVENTION

The present invention relates to the field of display technology, particularly relates to a display device.

BACKGROUND OF THE INVENTION

Currently, liquid crystal display (LCD) devices become the mainstream products in the market because of the excellent performance and the mature technology thereof. According to the type of light source, LCD devices are classified into transmissive type, reflective type and transflective (also called semi-transmissive semi-reflective) type.

A LCD device mainly comprises a color filter substrate and an array substrate which are assembled and aligned with each other, and a liquid crystal filled therebetween. The existing reflective and transflective LCD devices are applicable in outdoor so as to make use of ambient light sufficiently, i.e. external light is reflected to provide whole (reflective) or part (transflective) of light source required for displaying image. Both reflective LCD device and transflective LCD device have a plurality of pixel areas, each of which comprises a plurality of sub-pixel areas. In the reflective display devices, each sub-pixel area is a reflective area; in the transflective display devices, each sub-pixel area comprises a transmissive area and a reflective area. During the working process of reflective and transflective LCD devices, external light entered into the reflective area passes through the liquid crystal layer and the color filter substrate twice, which causes partial loss of the light and therefore a relatively low utilization of the external light especially in the case that the external light is weak. As a result, there is a problem that the display quality is not high in display devices.

SUMMARY OF THE INVENTION

In view of the foregoing defects existed in the prior art, the object of the present invention is to provide a display device being capable of converting the non-red, non-green and non-blue light in external light into tricolor light of red, green and blue light through excitation, and filtering light of other colors by color filter substrate. The display device utilizes other external light such as sunlight more sufficiently and increases the utilization of the external light, and thereby achieves a higher brightness and an improved color gamut.

The object of the present invention is achieved by providing a display device comprising a color filter substrate comprising a color filter layer, an array substrate and a liquid crystal layer disposed between the color filter substrate and the array substrate, wherein the display device further comprises a reflective layer and a light excitation layer; the reflective layer is disposed on the side away from the liquid crystal layer of the array substrate, the light excitation layer and the color filter substrate are disposed on the same side of the liquid crystal layer; the light excitation layer emits stimulated light upon being excited by external light and the reflective layer is capable of reflecting the stimulated light to the color filter layer.

Preferably, the light excitation layer is disposed on the side close to the liquid crystal layer or the side away from the liquid crystal layer of the color filter substrate; or a polaroid is disposed on the side away from the liquid crystal layer of the color filter substrate and the light excitation layer is disposed between the polaroid and the color filter substrate or on the side away from the color filter substrate of the polaroid.

Preferably, the color filter layer comprises a red filter layer, a green filter layer and a blue filter layer, and the light excitation layer is disposed in an area corresponding to at least one of the red filter layer, the green filter layer and the blue filter layer;

the light excitation layer corresponding to the red filter layer is red light excitation sublayer which absorbs the light in a wavelength shorter than red band in the external light and emits red light, whereas does not absorb red light in the external light; the light excitation layer corresponding to the green filter layer is green light excitation sublayer which absorbs the light in a wavelength shorter than green band in the external light and emit green light, whereas does not absorb green light in the external light; the light excitation layer corresponding to the blue filter layer is blue light excitation sublayer which absorbs light in a wavelength shorter than blue band in the external light and emit blue light, whereas does not absorb blue light in the external light.

Preferably, the red light excitation sublayer absorbs the light in a wavelength shorter than 622 nm and emits red light having a wavelength in the range of 622 nm to 760 nm; the green light excitation sublayer absorbs the light in a wavelength shorter than 492 nm and emits green light having a wavelength in the range of 492 nm to 577 nm; the blue light excitation sublayer absorbs the light in the wavelength shorter than 435 nm and emits blue light having a wavelength in the range of 435 nm to 450 nm.

Preferably, each of the red light excitation sublayer, the green light excitation sublayer and the blue light excitation sublayer comprises an quantum dot fluorescent powder, respectively; and the particle size of the quantum dot fluorescent powder in the red light excitation sublayer is in the range where the quantum dot fluorescent powder emits red light; the particle size of the quantum dot fluorescent powder in the green light excitation sublayer is in the range where the quantum dot fluorescent powder emits green light; and the particle size of the quantum dot fluorescent powder in the blue light excitation sublayer is in the range where the quantum dot fluorescent powder emits blue light.

Preferably, the particle size of the quantum dot fluorescent powder in the red light excitation sublayer is in the range of 2.3 nm to 5.5 nm; the particle size of the quantum dot fluorescent powder in the green light excitation sublayer is in the range of 2.7 nm to 3.5 nm; and the particle size of the quantum dot fluorescent powder in the blue light excitation sublayer is in the range of 2.0 nm to 2.5 nm.

Preferably, the red light excitation sublayer comprises a non-quantum dot red light fluorescent powder including blue light excited red fluorescent powder of alkaline earth metal sulfides, molybdate red fluorescent powder and tungstate-based red fluorescent powder; ultraviolet/near ultraviolet excited molybdate red fluorescent powder, tungstate-based red fluorescent powder, silicate-based red fluorescent powder, zinc oxide-based red fluorescent powder and vanadium phosphate-based red fluorescent powder; the green light excitation sublayer comprises a non-quantum dot green light fluorescent powder including blue light excited silicate-based green fluorescent powder; ultraviolet/near ultraviolet excited silicate-based green fluorescent powder and phosphate-based green fluorescent powder; and the blue light excitation sublayer comprises a non-quantum dot blue light fluorescent powder including ultraviolet/near ultraviolet excited aluminate-based blue fluorescent powder, borate-based blue fluorescent powder, chloroborate-based blue fluorescent powder, phosphate-based blue fluorescent powder and chlorosilicate-based blue fluorescent powder.

Preferably, the color filter layer further comprises a yellow filter layer; the light excitation layer is further disposed in an area corresponding to the yellow filter layer and the light excitation layer corresponding to the yellow filter layer is yellow light excitation sublayer which absorbs the light in a wavelength shorter than yellow band in the external light and emits yellow light, whereas does not absorb yellow light in the external light.

Preferably, the yellow light excitation sublayer comprises a quantum dot fluorescent powder having a particle size in the range where the quantum dot fluorescent powder emits yellow light; or the yellow light excitation sublayer comprises a non-quantum dot yellow light fluorescent powder including blue light excited aluminate-based yellow fluorescent powder, borate-based yellow fluorescent powder and vanadate-based yellow fluorescent powder; ultraviolet/near ultraviolet excited silicate-based yellow fluorescent powder and yellow fluorescent powder of nitrogen oxides.

Preferably, the particle size of the quantum dot fluorescent powder in the yellow light excitation sublayer is in the range of 3.6 nm to 4.3 nm.

Preferably, the light excitation layer is formed by pigment dispersion method, printing method or electro deposition method.

Preferably, the display device further comprises a backlight disposed on the side away from the liquid crystal layer of the array substrate; the reflective layer is disposed in an area corresponding to part of the color filter layer and the area without providing the reflective layer forms a transmissive area; and the light emitted by the backlight emits out of the display device through the transmissive area.

Preferably, the backlight emits white light; the red light excitation sublayer corresponding to the transmissive area is transparent and the white light passes through the red filter layer corresponding to the transmissive area and turns into red light; the green light excitation sublayer corresponding to the transmissive area is transparent and the white light passes through the green filter layer corresponding to the transmissive area and turns into green light; the blue light excitation sublayer corresponding to the transmissive area is transparent and the white light passes through the blue filter layer corresponding to the transmissive area and turns into blue light; or the backlight emits blue light; the red filter layer corresponding to the transmissive area is transparent and the red light excitation sublayer corresponding to the transmissive area absorbs blue light and emits red light; the green filter layer corresponding to the transmissive area is transparent and the green light excitation sublayer corresponding to the transmissive area absorbs blue light and emits green light; the blue filter layer corresponding to the transmissive area is transparent; or the backlight emits ultraviolet/near ultraviolet; the red filter layer corresponding to the transmissive area is transparent and the red light excitation sublayer corresponding to the transmissive area absorbs ultraviolet/near ultraviolet and emits red light; the green filter layer corresponding to the transmissive area is transparent and the green light excitation sublayer corresponding to the transmissive area absorbs ultraviolet/near ultraviolet and emits green light; the blue filter layer corresponding to the transmissive area is transparent and the blue light excitation sublayer corresponding to the transmissive area absorbs ultraviolet/near ultraviolet and emits blue light.

Preferably, the reflective layer is further disposed in an area corresponding to part of the yellow filter layer and the area without providing the reflective layer forms a transmissive area;

the backlight emits white light; the yellow light excitation sublayer corresponding to the transmissive area is transparent and the white light passes through the yellow filter layer corresponding to the transmissive area and turns into yellow light; or the backlight emits blue light; the yellow filter layer corresponding to the transmissive area is transparent and the yellow light excitation sublayer corresponding to the transmissive area absorbs blue light and emits yellow light; or the backlight emits ultraviolet/near ultraviolet; the yellow filter layer corresponding to the transmissive area is transparent and the yellow light excitation sublayer corresponding to the transmissive area absorbs ultraviolet/near ultraviolet and emits yellow light.

The display device provided by the present invention includes reflective and transflective display device, in each of which a special light excitation layer is disposed in an area corresponding to the reflective area. The light excitation layer corresponds to at least any one of the red, green and blue (even yellow) color filter layer, and red light excitation sublayer, green light excitation sublayer and blue light excitation sublayer (even yellow light excitation sublayer) corresponds to red filter layer, green filter layer and blue filter layer (even yellow filter layer), respectively. Thereby, the non-red, non-green and non-blue light in the external light can be converted into tricolor light of red, green and blue light (even including yellow light) through excitation, and the light of other colors can be filtered by the color filter layers in the color filter substrate. Thus, other external light such as sunlight can be utilized more sufficiently. That is to say, compared with the display devices in the prior art that merely adopt the way of reflecting external light into the display devices, the present invention further adopts the excitation to the light excitation layer by the external light and utilizes the stimulated light through secondary reflection. Thereby, the utilization of the external light is enhanced particularly in the case that the external light is weak, and the reflective/transflective liquid crystal display device achieves a higher brightness and an improved color gamut.

DESCRIPTION OF REFERENCE NUMBERS AND SIGNS 1 color filter substrate; R1 red filter layer; G1 green filter layer; B1 blue filter layer; 2 array substrate; 3 liquid crystal layer; 4 reflective layer; 5 light excitation layer; R2 red light excitation sublayer; G2 green light excitation sublayer; B blue light excitation sublayer; 6 polaroid; 7 backlight.

DETAILED DESCRIPTION OF CERTAIN EMBODIMENTS

In order to make those skilled in the art have a better understanding of the technical solutions of the present invention, more detailed description is provided below with reference to specific embodiments and the accompanying drawings.

Embodiment 1

The present embodiment provides a reflective liquid crystal display device.

Figure 1:
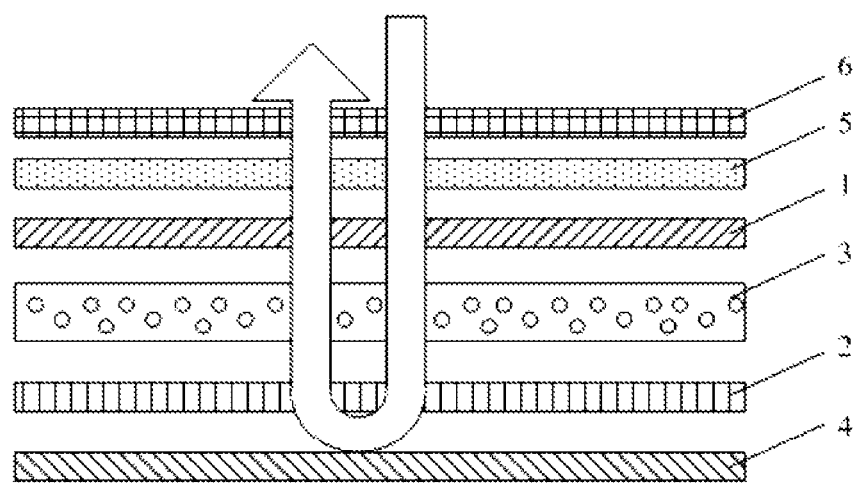
FIG. 1 is a structural schematic view showing the display device in Embodiment 1 of the present invention.

As shown in FIG. 1, the display device of the embodiment comprises a color filter substrate 1, an array substrate 2 and a liquid crystal layer 3 disposed between the color filter substrate 1 and the array substrate 2, and further comprises a reflective layer 4 (the area corresponding to the reflective layer 4 can be called as reflective area) and a light excitation layer 5; wherein the color filter substrate 1 comprises a color filter layer (For example, includes red filter layer R1, green filter layer G1 and blue filter layer B1); the reflective layer 4 is disposed on the side away from the liquid crystal layer 3 of the array substrate 2, the light excitation layer 5 and the color filter substrate 1 are disposed on the same side of the liquid crystal layer 3; the light excitation layer 5 can emits stimulated light upon being excited by external light and the reflective layer 4 can reflecting the stimulated light to the color filter layer, i.e., the reflective layer 4 can reflect the stimulated light back to the liquid crystal layer 3 and the color filter substrate 1 so that the stimulated light emits out of the display device.

Herein, the external light generally refers to all light except for the light emitted by the display device per se. For example, the external light includes the light emitted by daylight lamp, warm sunlight and natural light required for visual sense, etc. Generally, the natural light includes mixed-color light of different wavelength, such as blue, green and red light, etc.

The color filter substrate 1 also comprises an underlay (not shown in FIG. 1) and the color filter layer is disposed on the side close to the liquid crystal layer 3 of the underlay. The light excitation layer 5 and the color filter substrate 1 are disposed on the same side of the liquid crystal layer 3, which means that the light excitation layer 5 can be disposed on the side close to or away from the liquid crystal layer 3 of the color filter substrate 1. When the light excitation layer 5 is disposed on the side close to the liquid crystal layer 3 of the color filter substrate 1, it can be formed as a part of the color filter substrate 1 and prepared at the same time with the color filter substrate 1. Then, the color filter substrate 1 can be assembled and aligned with the array substrate 2 directly during the formation of a display panel. In this case, the structure of the display panel is relatively compact. When the light excitation layer 5 is disposed on the side away from the liquid crystal layer 3 of the color filter substrate 1, it may be formed after the formation of the color filter substrate 1, even after the formation of the display panel, such that the preparation process is relatively flexible. The position of the light excitation layer 5 can be varied flexibly according to the practical application and is not limited herein.

In the display device of the present embodiment, a polaroid 6 is also disposed on the side away from the liquid crystal layer 3 of the color filter substrate 1. When the light excitation layer 5 is disposed on the side away from the liquid crystal layer 3 of the color filter substrate 1, it can be disposed between the polaroid 6 and the color filter substrate 1, or on the side away from the color filter substrate 1 of the polaroid 6. The position of the light excitation layer 5 can be selected according to practical application and is not limited herein. As an example, FIG. 1 shows the light excitation layer 5 disposed between the polaroid 6 and the color filter substrate 1.

In order to colorize the images, the display device has three colors of sub-pixels, i.e., red (R), green (G) and blue (B) sub-pixels, which constitute one pixel and form images by gray scale modulation. In respective color filter layer, the color filter layer corresponding to red sub-pixel is red filter layer R1, the color filter layer corresponding to green sub-pixel is green filter layer G1, and the color filter layer corresponding to blue sub-pixel is blue filter layer B1. The light excitation layer 5 is disposed in an area corresponding to at least one of the red filter layer R1, the green filter layer G1 and the blue filter layer B1. Namely, the color filter layer has sub-pixel structures of R1, G1 and B1 and the light excitation layer 5 can be disposed in an area corresponding to one (for example, only green light excitation sublayer G2 is disposed in the area corresponding to the green filter layer G1 whereas red light excitation sublayer R2 corresponding to red filter layer R1 and blue light excitation sublayer B2 corresponding to blue filter layer B1 are not disposed in the light excitation layer 5), two (for example, green light excitation sublayer G2 and red light excitation sublayer R2 are disposed in the areas corresponding to the green filter layer G1 and the red filter layer R1, respectively, whereas blue light excitation sublayer B2 corresponding to the blue filter layer B1 is not disposed in the light excitation layer 5), or three (green light excitation sublayer G2 is disposed in the area corresponding to the green filter layer G1, red light excitation sublayer R2 is disposed in the area corresponding to the red filter layer R1 and blue light excitation sublayer B2 is disposed in the area corresponding to the blue filter layer B1) of the sub-pixel structures of R1, G1 and B1 of the color filter layer, so as to use the external light corresponding to these areas more sufficiently and increase the utilization rate of the display device to the external light, and therefore increase the brightness of the display device. It can be understood that, when the light excitation layer 5 is disposed simultaneously in three areas corresponding to R1, G1 and B1 of the color filter layer, respectively, the utilization rate to the light is maximum because three colors of light are all used. The present embodiment illustrates such case hereinafter.

Figure 2:
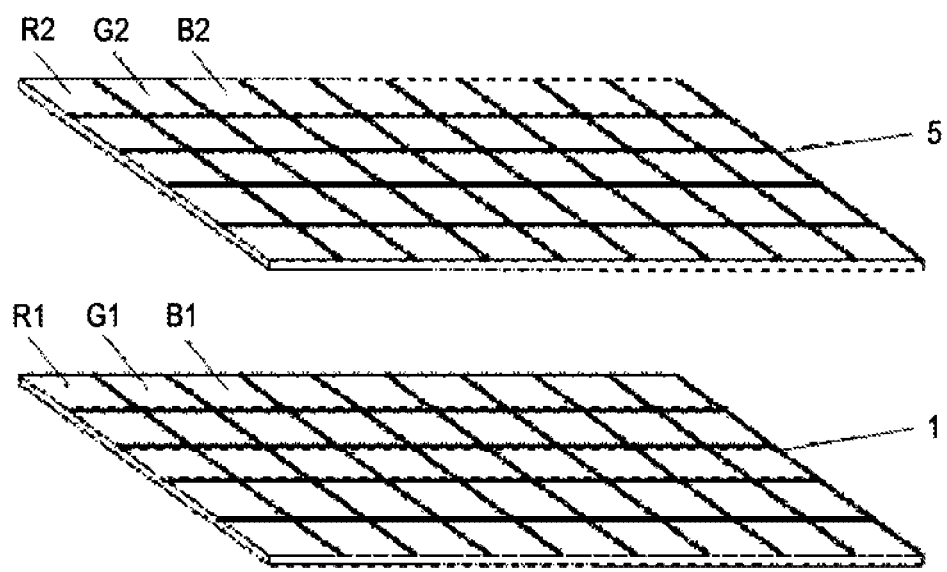
FIG. 2 is a structural schematic view showing the correspondence between the light excitation layer and the color filter layer in the color filter substrate.

In the present embodiment, the red light excitation sublayer R2, the green light excitation sublayer G2 and the blue light excitation sublayer B2 in the light excitation layer 5 correspond to the red filter layer R1, the green filter layer G1 and the blue filter layer B1 in the color filter substrate 1, respectively. As shown in FIG. 2, the R2 in the light excitation layer 5 corresponds to the red filter layer R1 in the color filter layer; the G2 in the light excitation layer 5 corresponds to the green filter layer G1 in the color filter layer; the B2 in the light excitation layer 5 corresponds to the blue filter layer B1 in the color filter layer. That is to say, the light excitation layer corresponding to the red filter layer R1 is the red light excitation sublayer R2, which can absorb the light in the wavelength shorter than red band in the external light and emit red light, whereas does not absorb red light in external light; the light excitation layer corresponding to the green filter layer G1 is the green light excitation sublayer G2, which can absorb the light in the wavelength shorter than green band in the external light and emit green light, whereas does not absorb green light in the external light; the light excitation layer corresponding to the blue filter layer B1 is the blue light excitation sublayer B2 which can absorb the light in the wavelength shorter than blue band in the external light and emit blue light, whereas does not absorb blue light in the external light. Specifically, first, the external light passes through and excites the light excitation layer 5 and blue, green and red light are emitted, while the original blue, green and red light in the external light pass through the light excitation layer 5 without loss substantially; then, the light passes through the color filter layer in the color filter substrate 1 such that other colors of light are removed; and then the light passes through the liquid crystal layer 3 and reaches the reflective layer 4 so as to be utilized through secondary reflection; finally, the light emits out of the display device via the liquid crystal layer 3 and the color filter substrate 1 again. By this process, the display device achieves image display.

In order to be emitted by the external light, the light excitation layer 5 of each color comprises respective fluorescent powders. For example, the red light excitation sublayer R2 comprises red fluorescent powder which can absorb the light in a wavelength shorter than red band in the sunlight and emit red light, whereas does not absorb original red light in the sunlight; accordingly, the green light excitation sublayer G2 comprises green fluorescent powder and the blue light excitation sublayer B2 comprises blue fluorescent powder. The blue fluorescent powder in the blue light excitation sublayer B2 can absorb the light in a wavelength shorter than 435 nm (or in a certain wavelength band thereof) and emit blue light having a wavelength ranging from 435 nm to 450 nm; the green fluorescent powder in the green light excitation sublayer G2 can absorb the light in a wavelength shorter than 492 nm (or in a certain wavelength band thereof) and emit green light having a wavelength ranging from 492 nm to 577 nm; the red fluorescent powder in the red light excitation sublayer R2 can absorb the light in a wavelength shorter than 622 nm (or in a certain wavelength band thereof) and emit red light having a wavelength ranging from 622 nm to 760 nm.

It will be appreciated that the excitation wavelength ranges of blue, green and red light are not defined strictly, which may be narrower than, wider than, or depart from the theoretical wavelength ranges according to the practical situation. The proportion among the blue fluorescent powder, green fluorescent powder and red fluorescent powder in the R, G, B sub-pixels respectively can be adjusted flexibly depending on the practical application so as to allow the blue, green and red light emitted out of the reflective display device to be mixed into the white light as seen by human eyes.

Figure 3:
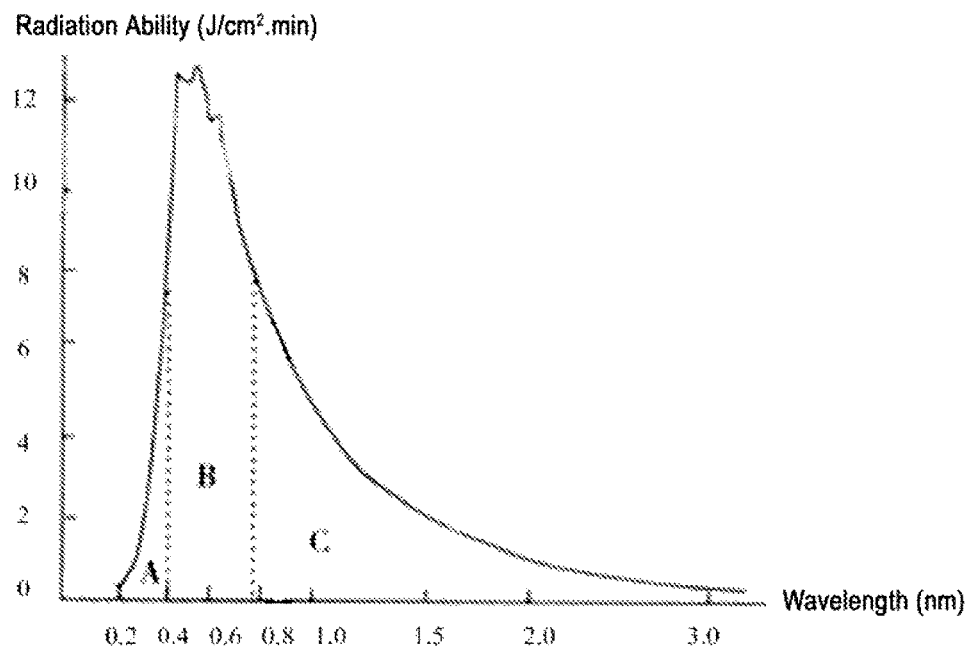
FIG. 3 shows the spectrum of the sunlight.

The sunlight is a kind of external light and the spectrum thereof is shown in FIG. 3, wherein the region A is ultraviolet light accounting for 8.7% of the solar spectrum; the region B is visible light accounting for 43% of the solar spectrum, which comprises mixed-color light having different wavelength ranges, such as blue, green and red light; and the region A is infrared light accounting for 48.3% of the solar spectrum.

Figure 4:
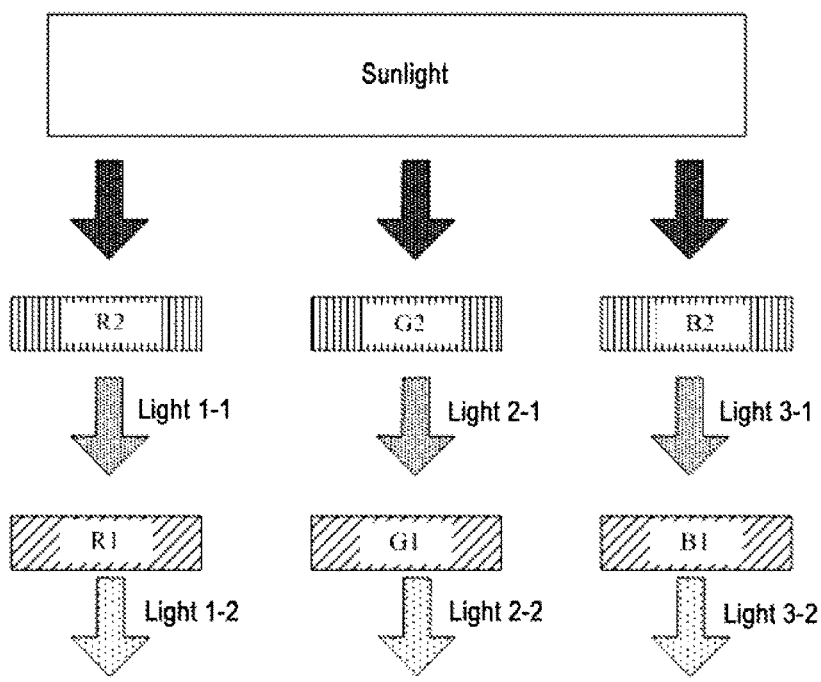
FIG. 4 is a schematic view showing the sunlight passing through the light excitation layer and the color filter layer.

The propagation process of the external light in the display device will be described hereinafter by taking the sunlight as an example. FIG. 4 shows the schematic view of the excitation process of the sunlight passing through the light excitation layer 5 and the absorption process of the color filter substrate 1. For example, the sunlight irradiates the green light excitation sublayer G2, such that the green fluorescent powder in G2 is excited by the sunlight in the wavelength shorter than green light (or a part of this band) and emits green light, while the original green light in the sunlight passes through G2 without loss substantially. As a result, the light 2-1 is formed. The incident light 2-1 onto the green filter layer G1 in the color filter substrate 1 is filtered by G1 and light 2-2 only comprising green light is formed.

The wavelength of the red light emitted by the red light excitation sublayer R2 upon absorbing the light in the wavelength shorter than 622 nm is in the range of 622 nm to 760 nm; the wavelength of the green light emitted by the green light excitation sublayer G2 upon absorbing the light in the wavelength shorter than 492 nm is in the range of 492 nm to 577 nm; the wavelength of the blue light emitted by the blue light excitation sublayer B2 upon absorbing the light in the wavelength shorter than 435 nm is in the range of 435 nm to 450 nm.

In particular, the quantum dot fluorescent powder is more advantageous compared with conventional fluorescent substances. For example, since the quantum dot fluorescent powder has a narrower excitation spectrum, its color is purer than conventional fluorescent substances and renders the display device improved color gamut. In the present embodiment, the red light excitation sublayer R2, the green light excitation sublayer G2 and the blue light excitation sublayer B2 comprise quantum dot fluorescent powder, respectively, wherein the particle size of the quantum dot fluorescent powder in the red light excitation sublayer is in the range where the quantum dot emits red light; the particle size of the quantum dot fluorescent powder in the green light excitation sublayer is in the range where the quantum dot emits green light; and the particle size of the quantum dot fluorescent powder in the blue light excitation sublayer is in the range where the quantum dot emits blue light. It can be understood by the skilled in the art that different quantum dot fluorescent powders which are capable of emitting a light of given color have different particle sizes.

Preferably, the particle size of the quantum dot fluorescent powder in the red light excitation sublayer R2 is in the range of 2.3 nm to 5.5 nm; the particle size of the quantum dot fluorescent powder in the green light excitation sublayer G2 is in the range of 2.7 nm to 3.5 nm; the particle size of the quantum dot fluorescent powder in the blue light excitation sublayer B2 is in the range of 2.0 nm to 2.5 nm.

The quantum dot fluorescent powder is mainly divided into Group II-VI quantum dot and Group III-V quantum dot according to the element constituent. In order to increase the fluorescence quantum efficiency and stability, the preparation of the "core-shell" quantum dot such as CdSe/CdS, CdSe/ZnS, CdTe/CdS, etc. becomes one of important choices. The term "core-shell" means that a high band gap "wall" is formed around the outer layer of a quantum dot so as to restrict the non-radiative transition of electrons. Since the photoluminescence spectrum of a quantum dot fluorescent powder depends on the band gap and the particle size of the quantum dot ultimately, the spectrum of a quantum dot fluorescent powder is mainly adjusted by controlling the particle size thereof during the preparation of the quantum dot fluorescent powder. That is to say, when the constituent material is given, quantum dots of different colors can be obtained by controlling the particle size thereof.

The materials of the quantum dot fluorescent powder include zinc sulfide (ZnS), zinc oxide (ZnO), gallium nitride (GaN), zinc telluride (ZnTe), gallium selenide (GaSe), cadmium selenide (CdSe), indium antimonide (InSb), lead telluride (PbTe), zinc selenide (ZnSe), tin sulfide (SnS), cadmium sulfide (CdS), cadmium telluride (CdTe), gallium arsenide (GaAs), indium phosphide (InP), gallium antimonide (GaSb), indium arsenide (InAs), tellurium (Te), lead sulfide (PbS), lead selenide (PbSe). The structure of the quantum dot may be a single core composed of one substance. For example, the quantum dot fluorescent powder may be formed by using cadmium selenide (CdSe) as the core merely. Taking cadmium selenide (CdSe) as an example, the preferable diameter for emitting red light is in the range of 2.3 nm to 5.5 nm. In addition, a quantum dot fluorescent powder can also be composed of a core and a outer coating layer, wherein the materials of the core include zinc sulfide (ZnS), zinc oxide (ZnO), gallium nitride (GaN), zinc selenide (ZnSe), cadmium sulfide (CdS), zinc telluride (ZnTe), gallium selenide (GaSe), cadmium selenide (CdSe), cadmium telluride (CdTe), gallium arsenide (GaAs), indium phosphide (InP), gallium antimonide (GaSb), indium arsenide (InAs), tellurium (Te), lead sulfide (PbS), indium antimonide (InSb), lead selenide (PbSe), lead telluride (PbTe); the materials of the coating layer include zinc sulfide (ZnS), zinc oxide (ZnO), gallium nitride (GaN), zinc selenide (ZnSe), cadmium sulfide (CdS), zinc telluride (ZnTe), gallium selenide (GaSe), cadmium selenide (CdSe), cadmium telluride (CdTe), gallium arsenide (GaAs), indium phosphide (InP), gallium antimonide (GaSb), indium arsenide (InAs), tellurium (Te), lead sulfide (PbS), indium antimonide (InSb), lead selenide (PbSe), lead telluride (PbTe). For example, when cadmium selenide (CdSe) is used as the core and zinc sulfide (ZnS) is used as the coating layer, the preferable thickness of the coating layer is 0.2 nm to 1.7 nm and the preferable total diameter of the whole quantum dot fluorescent powder is between 2.3 nm to 5.5 nm for emitting red light.

The method for preparing a quantum dot fluorescent powder includes many known methods such as hydrothermal method, hot colloid method and hot injection method. The specific process can be adjusted according to production conditions and is not expatiated herein.

In the present embodiment, the light excitation layer in the display device can be formed by many known methods such as pigment dispersion method, printing method or electro deposition method. The pigment dispersion method is a method that contacting corresponding fluorescent material with the color filter substrate so as to coat the color filter substrate and form a film thereon; thereafter, forming a light excitation layer by an exposure process and a development process. The printing method is a method that placing corresponding fluorescent material on a transfer plate; forming a light excitation layer by printing with an automatic printing device. The electro deposition method is a method that allowing the fluorescent material dispersed in water to be attached onto an ITO transparent electrode by electrophoretic deposition method, wherein the fluorescent material is uncharged while the resin material is charged, and the fluorescent material migrates along with the resin material to the transparent electrode when a current is applied and deposits thereon to form a light excitation layer.

Figure 5:
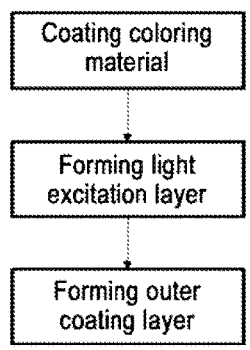
FIG. 5 is a schematic view showing the preparation method of the light excitation layer shown in FIG. 1.

One method for patterning the light excitation layer is shown in FIG. 5. The specific steps include: coating a coloring material which is a fluorescent material; forming a red light excitation sublayer, a green light excitation sublayer and a blue light excitation sublayer by steps of exposure, development and curing, etc.; forming a outer coating layer which plays a role of protecting the coloring materials. This method is known and is not expatiated herein.

The advantages of using quantum dot fluorescent powder include:

Firstly, the emission spectrum of a quantum dot fluorescent powder is single and "narrow". The full width at half maxima (FWHM) of quantum dot fluorescent powder is mostly equal to or less than 40 nm (the FWHM of conventional fluorescent powder is typically hundreds of nanometers), preferable 30 nm or even between 20 nm and 10 nm. Thus, it facilitates to enhance the color gamut.

Figure 6:
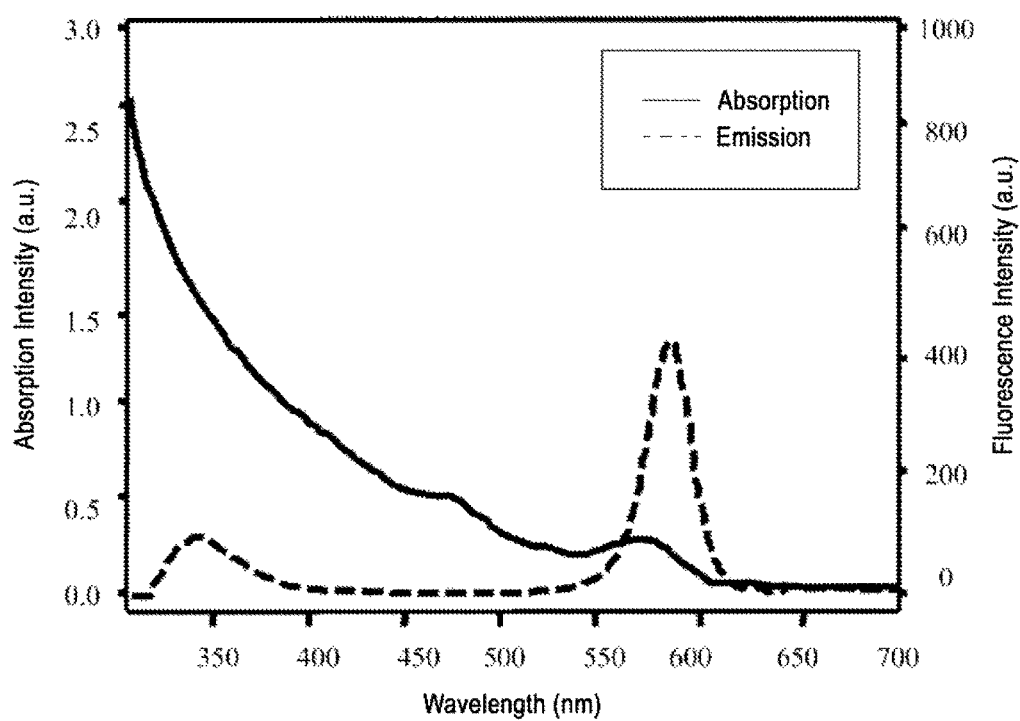
FIG. 6 shows the spectrum of the quantum dot CdSe/ZnS having a diameter of 3.6 nm.

Secondly, the excitation spectrum of a quantum dot fluorescent powder is wide such that any excitation wavelength can be selected within a wide wavelength band shorter than the excitation spectrum. This makes one can select the quantum dot fluorescent powder more conveniently. FIG. 6 shows the absorption-emission spectra of CdSe/ZnS quantum dot fluorescent powder having a diameter of 3.6 nm, wherein the absorption spectral line extends from the ultraviolet region to the vicinity of the emission peak; the emission peak of CdSe/ZnS quantum dot is at 587 nm and FWHM is 28 nm. The emission peaks of the quantum dot fluorescent powder are slightly biased under different excitation wavelengths. It is found that the difference between the wavelengths of emission peaks under an 300 nm excitation wavelength and an 500 nm excitation wavelength, respectively, is merely 4 nm. It can be seen that the excitation wavelength of a light source only influences slightly on the position of the emission peak. However, the excitation wavelength may influence the strength of the emission peak, that is, the shorter the excitation wavelength is, the stronger the excited light is.

Thirdly, the quantum dot fluorescent powder has high luminous intensity. The luminous intensity of a quantum dot fluorescent powder is several times, even dozens of times higher than the conventional small molecule organic dye, which makes it greatly enhances the brightness of a display device. This depends on both the fluorescence quantum efficiency and the molar extinction coefficient of the quantum dot.

Thus, by using the quantum dot fluorescent powder in the light excitation layer, a stronger emission light is obtained, and the color gamut is improved while the utilization rate to the external light is increased.

Embodiment 2

In another embodiment of the present invention, the fluorescent powders used in the light excitation layer of the display device of this invention are different from those used in embodiment 1.

In this embodiment, other types of fluorescent powders are used in the light excitation layer. Specifically, the red light excitation sublayer comprises non-quantum dot red light fluorescent powder which includes blue light excited red fluorescent powder of alkaline earth metal sulfides, molybdate red fluorescent powder and tungstate-based red fluorescent powder; ultraviolet/near ultraviolet excited molybdate and tungstate-based red fluorescent powder, silicate-based red fluorescent powder, zinc oxide-based red fluorescent powder and vanadium phosphate-based red fluorescent powder. The green light excitation sublayer comprises non-quantum dot green light fluorescent powder which includes blue light excited silicate-based green fluorescent powder; ultraviolet/near ultraviolet excited silicate-based green fluorescent powder and phosphate-based green fluorescent powder. The blue light excitation sublayer comprises non-quantum dot blue light fluorescent powder which includes ultraviolet/near ultraviolet excited aluminate-based blue fluorescent powder, borate-based blue fluorescent powder, chloroborate-based blue fluorescent powder, phosphate-based blue fluorescent powder and chlorosilicate-based blue fluorescent powder.

Similarly, the proportion among the blue fluorescent powder, green fluorescent powder and red fluorescent powder in the R, G, B sub-pixels respectively can be adjusted flexibly depending on the practical application so as to allow the blue, green and red light emitted out of the reflective display device to be mixed into the white light as seen by human eyes.

Embodiment 3

The present embodiment provides a reflective liquid crystal display device. Different from any one of the embodiments described above, the numbers of the sub-pixel composing a pixel unit is four rather than three in the present embodiment.

Generally, one pixel in a display device only includes three sub-pixels, i.e., R, G and B sub-pixels. In recent years, however, in order to enhance the color gamut of the display device, the structure includes four or more sub-pixels, i.e., includes additional sub-pixels of other colors in addition to R, G and B sub-pixels, has appeared.

The present embodiment illustrates the addition of a yellow sub-pixel in the display device. Accordingly, the color filter layer further includes yellow filter layer Y1 and the light excitation layer 5 is further disposed on an area corresponding to the yellow filter layer Y1. Such light excitation layer is yellow light excitation sublayer Y2 which can absorb light in the wavelength shorter than yellow band in the external light and emit yellow light, whereas does not absorb original yellow light in the external light.

The yellow light excitation sublayer Y2 comprises a quantum dot fluorescent powder and the particle size of which is in the range where the quantum dot emits yellow light, preferably in the range of 3.6-4.3 nm.

Alternatively, the yellow light excitation sublayer Y2 comprises non-quantum dot yellow light fluorescent powder which includes blue light excited aluminate-based yellow fluorescent powder, borate-based yellow fluorescent powder and vanadate-based yellow fluorescent powder, etc; ultraviolet/near ultraviolet excited silicate-based yellow fluorescent powder and yellow fluorescent powder of nitrogen oxides.

The display device of the present embodiment increases the utilization to the external light in the same way with that of any one of the display device as described in above embodiments and is not expatiated herein.

Embodiment 4

The present embodiment provides a transflective display device.

Figure 10:
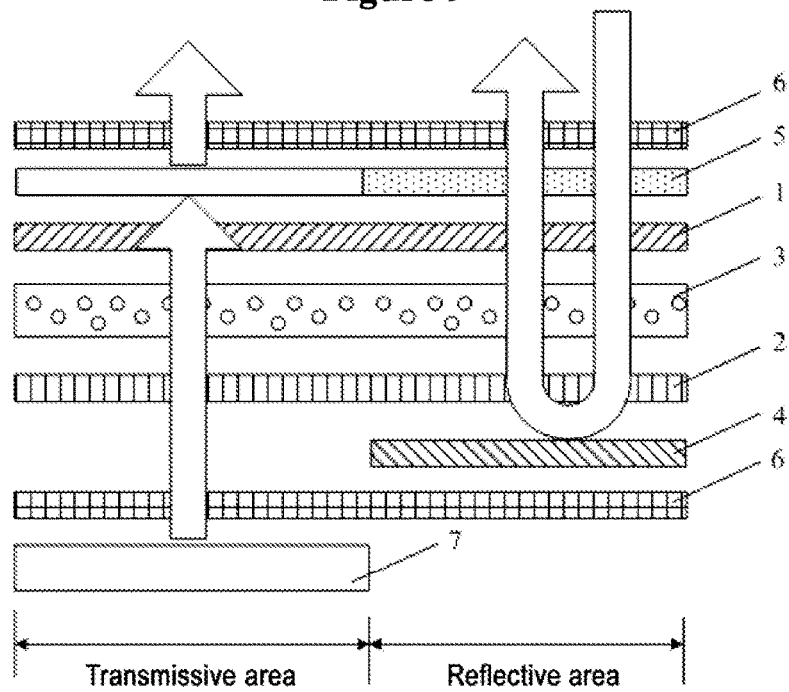
FIG. 10 is a structural schematic view showing the display device in Embodiment 4 of the present invention.
Figure 11:
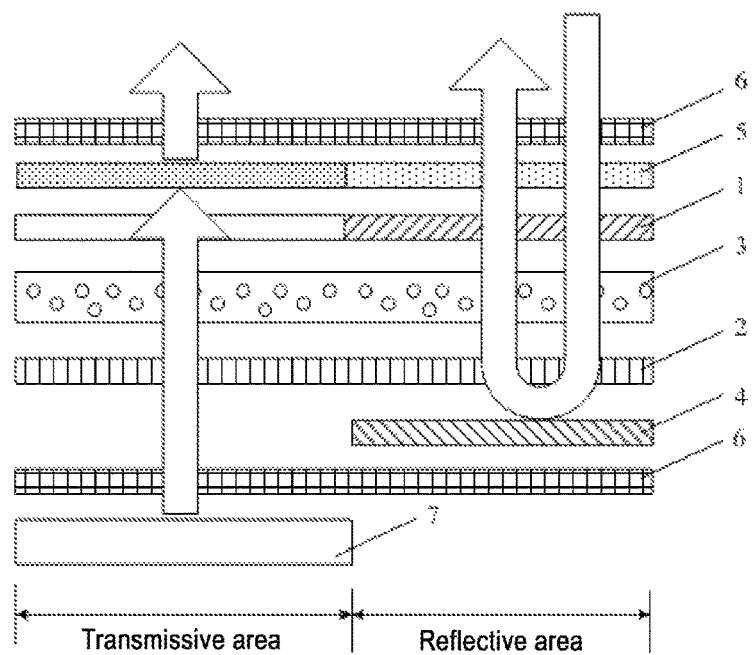
FIG. 11 is a structural schematic view showing the display device in Embodiment 5 of the present invention.
Figure 12:
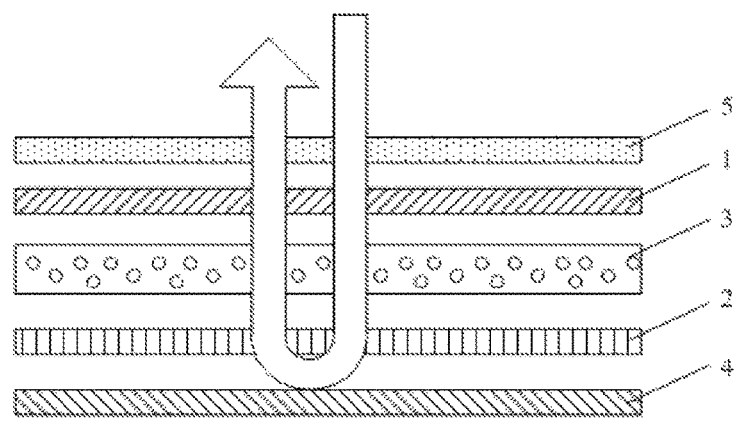
FIGS. 12-15 are structural schematic views showing the display devices in the preferable embodiments of the present invention.
Figure 13:
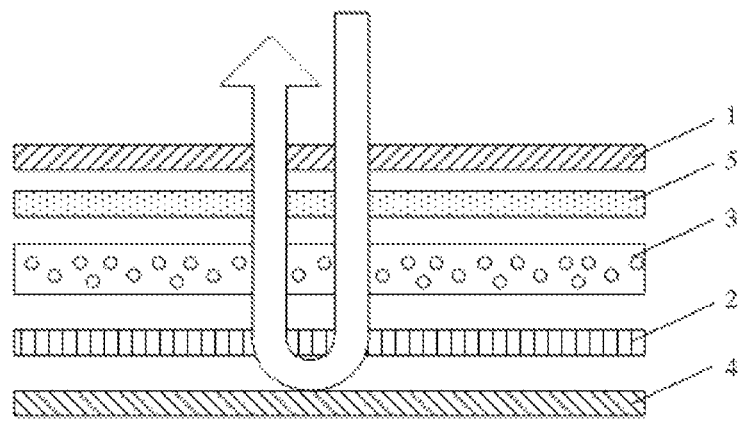
Figure 14:
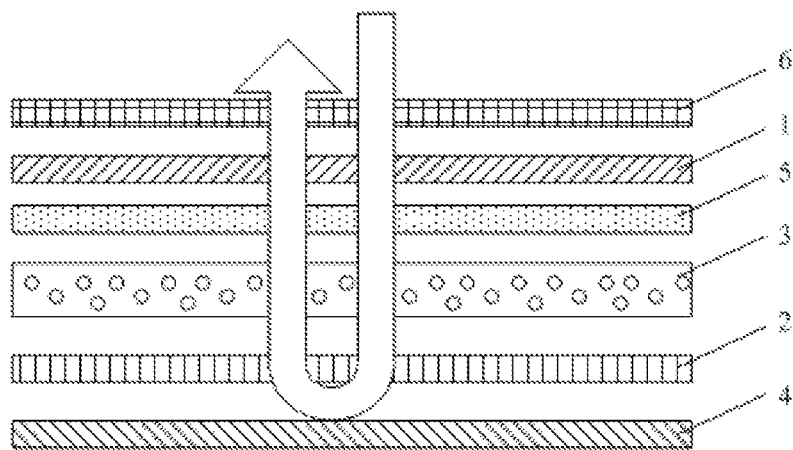
Figure 15:
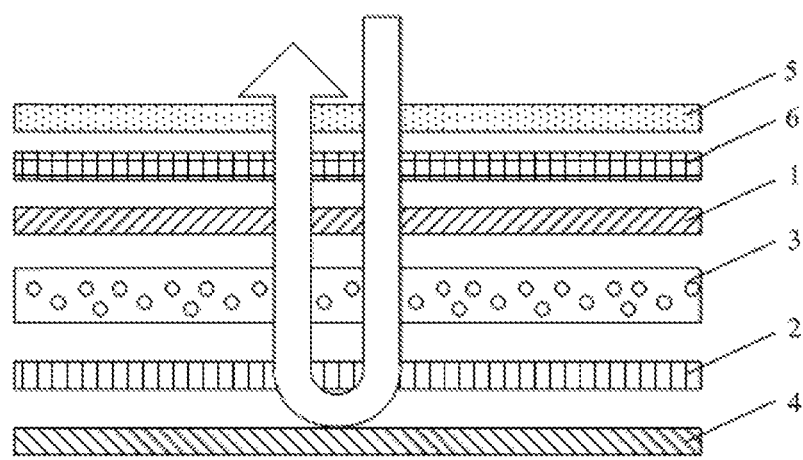

FIG. 10 shows the structural schematic view of the transflective display device, which is divided into a reflection area and a transmission area. The light source of the transmission area is provided by a backlight. The structure of the reflection area is the same with that of the reflective display device described in any one of the embodiments 1-3 and the light source of the reflection area is provided by the external light.

As shown in FIG. 10, a polaroid 6 is also disposed on the side away from the liquid crystal layer 3 of the array substrate 2, wherein the polarization axis thereof is perpendicular to that of the polaroid 6 disposed on the side away from the liquid crystal layer 3 of the color filter substrate 1 so as to modulate the lights entering into and exiting out of the display device.

In the present embodiment, the display device further comprises a backlight 7 disposed on the side away from the liquid crystal layer of the array substrate. The reflective layer 4 is disposed partially in the area corresponding to the red sub-pixel R, the green sub-pixel G and the blue sub-pixel B. The area without providing the reflective layer 4 forms a transmissive area. The light emitted by the backlight 7 emits out of the display device through the array substrate 2, the liquid crystal layer 3, the color filter substrate 1 and the light excitation layer 5 corresponding to the transmissive area.

In the present embodiment, the light emitted by the backlight 7 is a white light. The red light excitation sublayer corresponding to the transmissive area of the red sub-pixel is transparent and the white light passes through the red filter layer corresponding to the transmissive area and turns into red light; the green light excitation sublayer corresponding to the transmissive area of the green sub-pixel is transparent and the white light passes through the green filter layer corresponding to the transmissive area and turns into green light; the blue light excitation sublayer corresponding to the transmissive area of the blue sub-pixel is transparent and the white light passes through the blue filter layer corresponding to the transmissive area and turns into blue light.

That is, when the light emitted by the backlight is a white light, only the color filter layer of each sub-pixel in the transmissive area is set while the corresponding light excitation layer is transparent. As a result, a tricolor light of R, G and B is formed by the filtering of the color filter layer.

In this transflective display device, the external light corresponding to the reflective area in each sub-pixel can be excited by the light excitation layer and reflected by the reflective layer so as to be secondarily used. As a result, the utilization rate to the external light is increased and the brightness of the display device is improved.

Embodiment 5

The present embodiment provides a transflective liquid crystal display device. Compared with the embodiment 4, the backlight of this embodiment is different and the setting manner of the color filter substrate is changed, accordingly.

In this embodiment, the light emitted by the backlight 7 is a blue light. The red filter layer corresponding to the transmissive area of the red sub-pixel is transparent and the red light excitation sublayer corresponding to the transmissive area absorbs blue light and emits red light; the green filter layer corresponding to the transmissive area of the green sub-pixel is transparent and the green light excitation sublayer corresponding to the transmissive area absorbs blue light and emits green light; the blue filter layer corresponding to the transmissive area of the blue sub-pixel is transparent. As a result, a tricolor light of R, G and B is formed by the excitation of blue light.

Alternatively, the light emitted by the backlight is an ultraviolet/near ultraviolet. The red filter layer corresponding to the transmissive area of the red sub-pixel is transparent and the red light excitation sublayer corresponding to the transmissive area absorbs ultraviolet/near ultraviolet and emits red light; the green filter layer corresponding to the transmissive area of the green sub-pixel is transparent and the green light excitation sublayer corresponding to the transmissive area absorbs ultraviolet/near ultraviolet and emits green light; the blue filter layer corresponding to the transmissive area of the blue sub-pixel is transparent and the blue light excitation sublayer corresponding to the transmissive area absorbs ultraviolet/near ultraviolet and emits blue light. As a result, a tricolor light of R, G and B is formed by the excitation of ultraviolet/near ultraviolet.

That is, when the light emitted by the backlight is a blue light or an ultraviolet/near ultraviolet, only the light excitation layer of each sub-pixel in the transmissive area is set while the corresponding color filter layer is transparent. In particular, when the backlight is blue, the blue excitation sublayer can be set to transparent; the red light excitation sublayer and the green light excitation sublayer are provided with respective fluorescent powders and thereby form a red light and a green light respectively by the excitation of the blue light, and then the red and green light form a color light with the blue light. When the backlight is an ultraviolet/near ultraviolet, the blue light excitation sublayer, the red light excitation sublayer and the green light excitation sublayer are provided with respective fluorescent powders and thereby form blue, red and green light respectively by the excitation of the ultraviolet/near ultraviolet, and then form a color light.

The display device of the present embodiment increases the utilization to the external light in the same manner with that of the display device of embodiment 4 and is not expatiated herein. The external light is secondarily used by the display device. As a result, the utilization rate to the external light is increased and the brightness of the display device is improved.

Embodiment 6

The present embodiment provides a transflective liquid crystal display device. Different from embodiment 4 or 5, the numbers of the sub-pixel composing a pixel unit is four rather than three in the present embodiment.

In the present embodiment, the display device further comprises yellow sub-pixel Y. Accordingly, the color filter layer further includes yellow filter layer Y1 and the light excitation layer 5 is further disposed on an area corresponding to the yellow filter layer Y1. Such light excitation layer is yellow light excitation sublayer Y2. The reflective layer 4 is disposed partially and corresponds to the yellow filter layer Y1 and the area without providing the reflective layer forms a transmissive area.

Corresponding to the structure of the display device in embodiment 4, in this embodiment, the light emitted by the backlight 7 is a white light; the yellow light excitation sublayer Y2 corresponding to the transmissive area of the yellow sub-pixel Y is transparent and the white light passes through the yellow filter layer Y1 corresponding to the transmissive area and turns into yellow light.

Alternatively, corresponding to the structure of the display device in embodiment 5, in this embodiment, the light emitted by the backlight 7 is a blue light; the yellow filter layer Y1 corresponding to the transmissive area of the yellow sub-pixel Y is transparent and the yellow light excitation sublayer Y2 corresponding to the transmissive area absorbs blue light and emits yellow light; or the light emitted by the backlight 7 is an ultraviolet/near ultraviolet, the yellow filter layer Y1 corresponding to the transmissive area of the yellow sub-pixel Y is transparent and the yellow light excitation sublayer Y2 corresponding to the transmissive area absorbs the ultraviolet/near ultraviolet and emits yellow light.

The display device of the present embodiment increases the utilization to the external light in the same manner with that of the display device of embodiment 4 and is not expatiated herein. The external light is secondarily used by the display device. As a result, the utilization rate to the external light is increased and the brightness of the display device is improved.

The display device described in the present invention can be any product or component having display function, such as electronic paper, mobile phone, tablet PC, television, displayer, laptop, digital photo frame, navigator, etc. The display device exhibits increased utilization rate to the external light and is suitable for a wider application scope.

As used in this specification and the appended claims, the words "a", "an", and "the", or cases not indicating quantity, include plural referents unless the content clearly dictates otherwise.

Example 1

Figure 7:
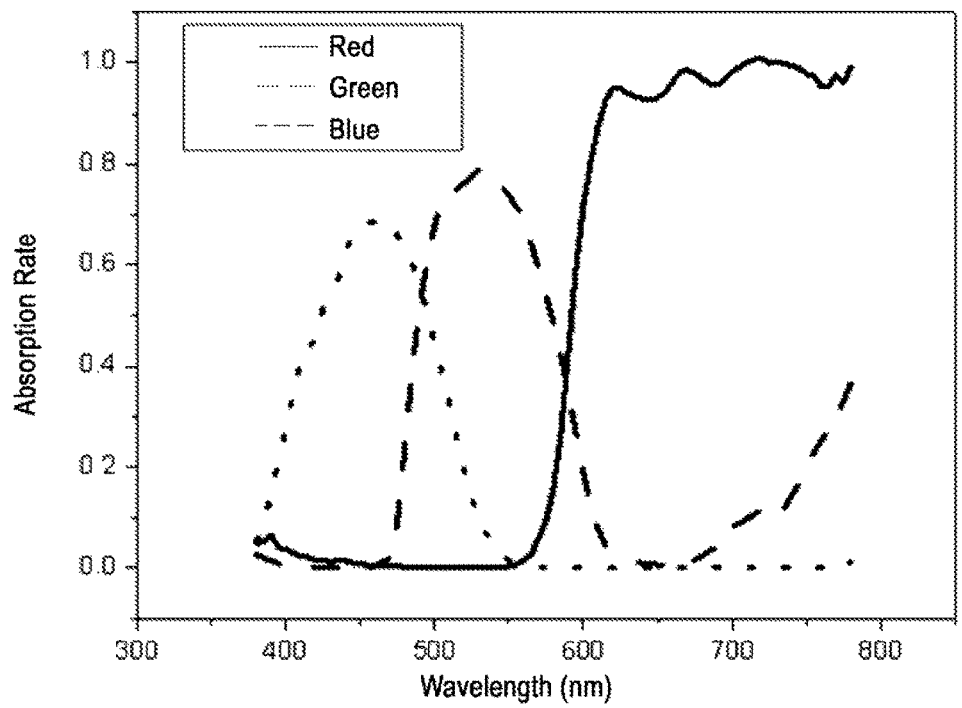
FIG. 7 shows the absorption spectrum of the color filter substrate in Example 1 of the present invention.

As a specific example of embodiment 1, in this Example, 8880 of DWFC Corporation was used as the color filter substrate, the thickness of which is 2.4 μm and the absorption spectrum is shown in FIG. 7.

Figure 8:
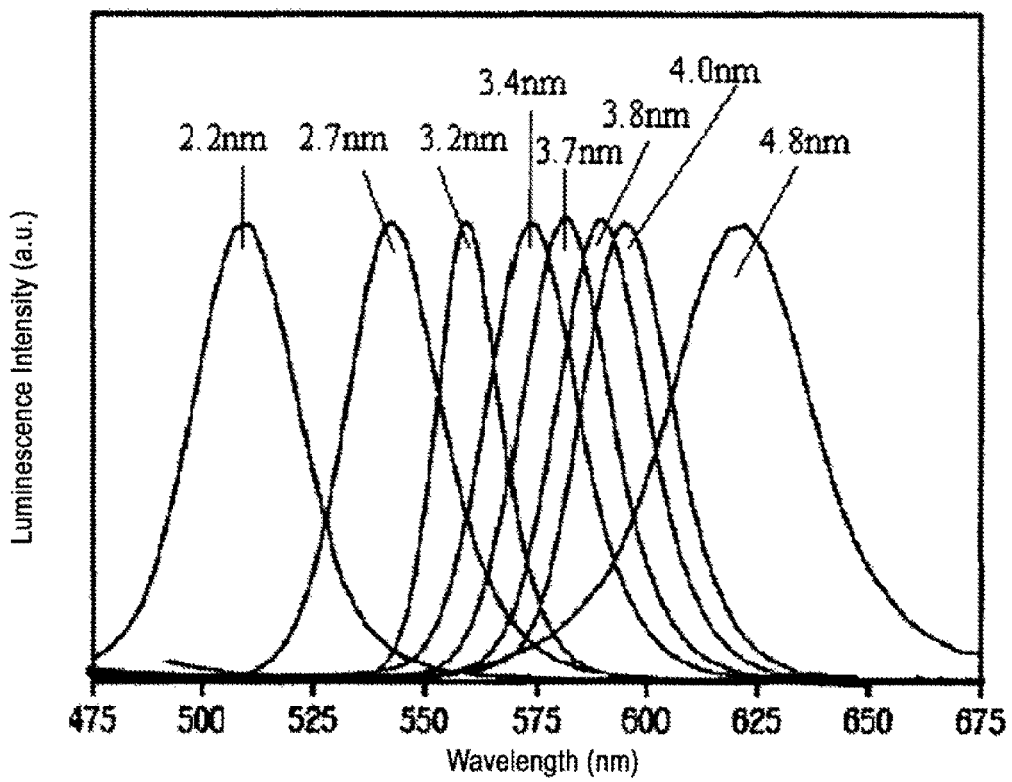
FIG. 8 shows the emission spectra of quantum dots CdSe/ZnSe having different particle sizes.

CdSe/ZnSe quantum dot was used as the fluorescent powder in the red light excitation sublayer R2 and the green light excitation sublayer G2 in the light excitation layer 5. FIG. 8 shows the emission spectra of CdSe/ZnSe quantum dots of different particle size. It can be seen from FIG. 8 that when the diameter of the quantum dot is 4.8 nm, the position of the emission peak is near 625 nm which belongs to the region of red light and is less absorbed by the red filter layer R1. Thus, CdSe/ZnSe quantum dot having a diameter of 4.8 nm can be used as the fluorescent powder in the red sub-pixel. When the diameter of the quantum dot is 2.7-3.2 nm, the position of the emission peak is near 550 nm which belongs to the region of green light and is less absorbed by the green filter layer G1. Thus, CdSe/ZnSe quantum dot having a diameter of 2.7-3.2 nm can be used as the fluorescent powder in the green sub-pixel.

In the display device of the Example, since the natural light was further utilized by the quantum dot fluorescent powder in the red sub-pixel and the green sub-pixel, the brightness of the display device was increased compared with the display device of the prior art when tested with the integrating sphere (IS-*MA, available from Lisun Electronics Inc.) under the same condition. The brightness of the display device of the Example was increased by 10%-50% depending on the concentration of the quantum dot fluorescent powder used.

Example 2

In the Example, 8880 of DWFC Corporation was also used as the color filter substrate and the thickness of which is 2.4 μm.

The fluorescent powder used in the red light excitation sublayer R2 and the green light excitation sublayer G2 in the light excitation layer 5 were the same with that in Example 1, but the blue light excitation sublayer B2 was set to transparent. Namely, no fluorescent powder was provided in the blue light excitation sublayer B2, and the sunlight can pass through the blue light excitation sublayer B2 without being absorbed and subsequently passes through the blue filter layer B1 in the color filter substrate 1 so as to be converted into a blue light upon filtration.

The same text according to Example 1 was preformed. Compared with the display device of the prior art, the brightness of the display device of the Example was increased by 6%-46% depending on the concentration of the quantum dot fluorescent powder used.

Example 3

In the Example, 8880 of DWFC Corporation was also used as the color filter substrate and the thickness of which is 2.4 μm.

Figure 9:
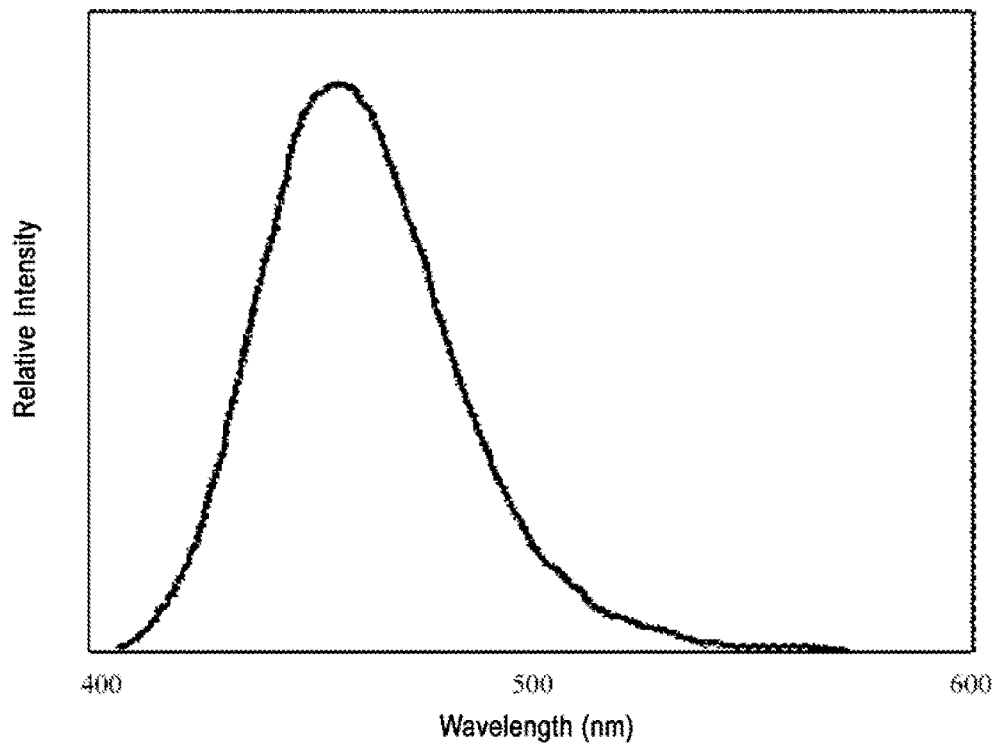
FIG. 9 shows the emission spectra of a non-quantum dot fluorescent powder used in Example 3 of the present invention.

The fluorescent powder used in the red light excitation sublayer R2 and the green light excitation sublayer G2 in the light excitation layer 5 were the same with that used in Example 1, but the fluorescent powder used in the blue light excitation sublayer B2 was the non-quantum dot fluorescent powder described in above embodiment 2, rather than the quantum dot fluorescent powder used in Example 1. The composition of the non-quantum dot fluorescent powder is $Ba_{0.88}MgAl_{10}O_{17}:Eu_{0.12}$ (2 h, crystallization temperature is 1300° C.) which can absorb the light having a wavelength of 250 nm to 450 nm. As shown in FIG. 9, the wavelength range of the emission spectrum thereof is from 400 nm to 530 nm and the emission peak is at 450 nm.

The same text according to Example 1 was preformed. Compared with the display device of the prior art, the brightness of the display device of the Example was increased by about 8%-48% depending on the concentration of the quantum dot fluorescent powder used.

The display device provided by the present invention includes reflective and transflective display device, in each of which a special light excitation layer is disposed in an area corresponding to the reflective area. The light excitation layer corresponds to at least any one of the red, green and blue (even yellow) color filter layer, and red light excitation sublayer, green light excitation sublayer and blue light excitation sublayer (even yellow light excitation sublayer) corresponds to red filter layer, green filter layer and blue filter layer (even yellow filter layer), respectively. Thereby, the non-red, non-green and non-blue light in the external light can be converted into tricolor light of red, green and blue light (even including yellow light) through excitation, and the light of other colors can be filtered by the color filter layers in the color filter substrate. Thus, other external light such as sunlight can be utilized more sufficiently. That is to say, compared with the display devices in the prior art that merely adopt the way of reflecting the external light into the display devices, the present invention further adopts the excitation to the light excitation layer by the external light and utilizes the stimulated light through secondary reflection. Thereby, the utilization of the external light is enhanced particularly in the case that the external light is weak, and the reflective/transflective liquid crystal display device achieves a higher brightness and an improved color gamut.

Furthermore, when the light excitation layer comprises the quantum dot fluorescent powder, the color gamut is improved because the quantum dot fluorescent powder has narrower emission spectrum and purer color. In addition, since the quantum dot fluorescent powder has wider excitation spectrum and higher luminous intensity, it emits stronger stimulated light and exhibits more efficient effect for increasing the brightness of the display device.

It should be understood that the embodiments described above are merely the exemplary embodiments for the purpose of illustrating the principles of the present invention, which shall not limit the scope of the invention. Various changes and modifications to the present invention made without departing from the scope and spirit of invention by a person skilled in the art should all be covered in the protection scope of the present invention.

The invention claimed is:

1. A display device comprising the following components: a color filter substrate comprising a color filter layer, an array substrate, a liquid crystal layer,
    a reflective layer and a light excitation layer; said components are disposed according to the following sequences:
    a) the light excitation layer, the color filter substrate, the liquid crystal layer, the array substrate, and the reflective layer; or
    b) the color filter substrate, the light excitation layer, the liquid crystal layer, the array substrate, and the reflective layer; and
    wherein the light excitation layer emits stimulated light upon being excited by external light and the reflective layer is capable of reflecting the stimulated light to the color filter layer.

2. The display device according to claim 1, characterized in that it further comprises a polaroid disposed on a side away from the liquid crystal layer of the color filter substrate.

3. The display device according to claim 1, characterized in that:
    the color filter layer comprises a red filter layer, a green filter layer and a blue filter layer, and the light excitation layer is disposed in an area corresponding to at least one of the red filter layer, the green filter layer and the blue filter layer;
    the light excitation layer corresponding to the red filter layer is red light excitation sublayer which absorbs the light in a wavelength shorter than red band in the external light and emits red light, whereas does not absorb red light in the external light; the light excitation layer corresponding to the green filter layer is green light excitation sublayer which absorbs the light in a wavelength shorter than green band in the external light and emit green light, whereas does not absorb green light in the external light; the light excitation layer corresponding to the blue filter layer is blue light excitation sublayer which absorbs light in a wavelength shorter than blue band in the external light and emit blue light, whereas does not absorb blue light in the external light.

4. The display device according to claim 3, characterized in that the red light excitation sublayer absorbs the light in a wavelength shorter than 622 nm and emits red light having a wavelength in the range of 622 nm to 760 nm; the green light excitation sublayer absorbs the light in a wavelength shorter than 492 nm and emits green light having a wavelength in the range of 492 nm to 577 nm; the blue light excitation sublayer absorbs the light in the wavelength shorter than 435 nm and emits blue light having a wavelength in the range of 435 nm to 450 nm.

5. The display device according to claim 3, characterized in that:

each of the red light excitation sublayer, the green light excitation sublayer and the blue light excitation sublayer comprises an quantum dot fluorescent powder, respectively; and the particle size of the quantum dot fluorescent powder in the red light excitation sublayer is in the range where the quantum dot fluorescent powder emits red light; the particle size of the quantum dot fluorescent powder in the green light excitation sublayer is in the range where the quantum dot fluorescent powder emits green light; and the particle size of the quantum dot fluorescent powder in the blue light excitation sublayer is in the range where the quantum dot fluorescent powder emits blue light.

6. The display device according to claim 5, characterized in that the particle size of the quantum dot fluorescent powder in the red light excitation sublayer is in the range of 2.3 nm to 5.5 nm; the particle size of the quantum dot fluorescent powder in the green light excitation sublayer is in the range of 2.7 nm to 3.5 nm; and the particle size of the quantum dot fluorescent powder in the blue light excitation sublayer is in the range of 2.0 nm to 2.5 nm.

7. The display device according to claim 3, characterized in that:

the red light excitation sublayer comprises a non-quantum dot red light fluorescent powder including blue light excited red fluorescent powder of alkaline earth metal sulfides, molybdate red fluorescent powder and tungstate-based red fluorescent powder; ultraviolet/near ultraviolet excited molybdate red fluorescent powder, tungstate-based red fluorescent powder, silicate-based red fluorescent powder, zinc oxide-based red fluorescent powder and vanadium phosphate-based red fluorescent powder;

the green light excitation sublayer comprises a non-quantum dot green light fluorescent powder including blue light excited silicate-based green fluorescent powder; ultraviolet/near ultraviolet excited silicate-based green fluorescent powder and phosphate-based green fluorescent powder; and the blue light excitation sublayer comprises a non-quantum dot blue light fluorescent powder including ultraviolet/near ultraviolet excited aluminate-based blue fluorescent powder, borate-based blue fluorescent powder, chloroborate-based blue fluorescent powder, phosphate-based blue fluorescent powder and chlorosilicate-based blue fluorescent powder.

8. The display device according to claim 3, characterized in that the color filter layer further comprises a yellow filter layer; the light excitation layer is further disposed in an area corresponding to the yellow filter layer and the light excitation layer corresponding to the yellow filter layer is yellow light excitation sublayer which absorbs the light in a wavelength shorter than yellow band in the external light and emits yellow light, whereas does not absorb yellow light in the external light.

9. The display device according to claim 8, characterized in that:

the yellow light excitation sublayer comprises a quantum dot fluorescent powder having a particle size in the range where the quantum dot fluorescent powder emits yellow light; or the yellow light excitation sublayer comprises a non-quantum dot yellow light fluorescent powder including blue light excited aluminate-based yellow fluorescent powder, borate-based yellow fluorescent powder and vanadate-based yellow fluorescent powder; ultraviolet/near ultraviolet excited silicate-based yellow fluorescent powder and yellow fluorescent powder of nitrogen oxides.

10. The display device according to claim 9, characterized in that the particle size of the quantum dot fluorescent powder in the yellow light excitation sublayer is in the range of 3.6 nm to 4.3 nm.

11. The display device according to claim 1, characterized in that the light excitation layer is formed by pigment dispersion method, printing method or electro deposition method.

12. The display device according to claim 3, characterized in that:

the display device further comprises a backlight disposed on the side away from the liquid crystal layer of the array substrate;

the reflective layer is disposed in an area corresponding to part of the color filter layer and the area without providing the reflective layer forms a transmissive area; and the light emitted by the backlight emits out of the display device through the transmissive area.

13. The display device according to claim 12, characterized in that:

the backlight emits white light; the red light excitation sublayer corresponding to the transmissive area is transparent and the white light passes through the red filter layer corresponding to the transmissive area and turns into red light; the green light excitation sublayer corresponding to the transmissive area is transparent and the white light passes through the green filter layer corresponding to the transmissive area and turns into green light; the blue light excitation sublayer corresponding to the transmissive area is transparent and the white light passes through the blue filter layer corresponding to the transmissive area and turns into blue light; or the backlight emits blue light; the red filter layer corresponding to the transmissive area is transparent and the red light excitation sublayer corresponding to the transmissive area absorbs blue light and emits red light; the green filter layer corresponding to the transmissive area is transparent and the green light excitation sublayer corresponding to the transmissive area absorbs blue light and emits green light; the blue filter layer corresponding to the transmissive area is transparent; or the backlight emits ultraviolet/near ultraviolet; the red filter layer corresponding to the transmissive area is transparent and the red light excitation sublayer corresponding to the transmissive area absorbs ultraviolet/near ultraviolet and emits red light; the green filter layer corresponding to the transmissive area is transparent and the green light excitation sublayer corresponding to the transmissive area absorbs ultraviolet/near ultraviolet and emits green light; the blue filter layer corresponding to the transmissive area is transparent and the blue light excitation sublayer corresponding to the transmissive area absorbs ultraviolet/near ultraviolet and emits blue light.

14. The display device according to claim 13, characterized in that:

the reflective layer is disposed in an area corresponding to part of the yellow filter layer and the area without providing the reflective layer forms a transmissive area;

the backlight emits white light; the yellow light excitation sublayer corresponding to the transmissive area is transparent and the white light passes through the yellow filter layer corresponding to the transmissive area and turns into yellow light; or the backlight emits blue light; the yellow filter layer corresponding to the transmissive area is transparent and the yellow light excitation sublayer corresponding to the transmissive area absorbs blue light and emits yellow light; or the backlight emits ultraviolet/near ultraviolet; the yellow filter layer corresponding to the transmissive area is transparent and the yellow light excitation sublayer corresponding to the transmissive area absorbs ultraviolet/near ultraviolet and emits yellow light.

15. The display device according to claim 2, when said components are disposed according to sequence a), the light excitation layer is disposed between the polaroid and the color filter substrate or on a side away from the color filter substrate of the polaroid.

* * * * *